UNITED STATES PATENT OFFICE.

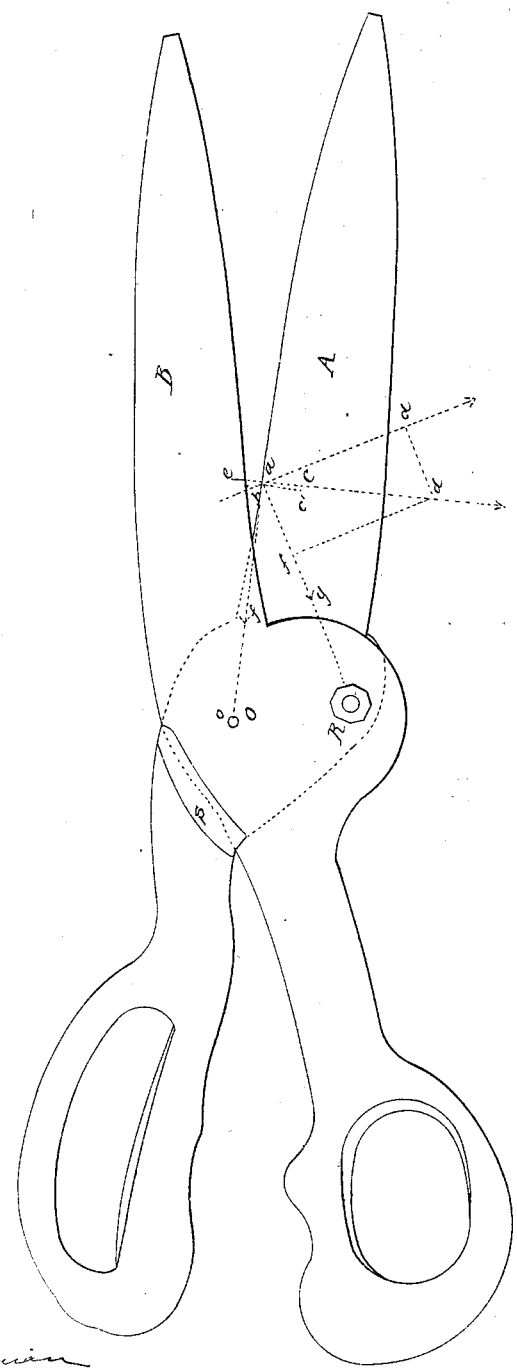
J. Phares,
Riveting Shears.
N° 11,679.   Patented Sep. 12, 1854.

JOSEPH PHARES, OF CINCINNATI, OHIO.

TAILOR'S SHEARS.

Specification of Letters Patent No. 11,679, dated September 12, 1854.

*To all whom it may concern:*

Be it known that I, JOSEPH PHARES, of Cincinnati, Hamilton county, Ohio, have invented an Improvement in Tailors' Shears; and I hereby declare that the following is a full and exact description thereof, reference being had to the accompanying drawing and the letters of reference marked thereon.

Let A and B represent the upper and lower blades of a pair of shears. Instead placing the rivet, or axis of revolution, within the angle formed by the edges of the blades prolonged, I place it at any desirable point without, giving to the blades at that part, suitable shapes for the purpose: for example at R.

To steady the motion of the edges and prevent them from spreading, I attach to or form on one of the blades a metallic lip or guide S of sufficient length having its inner edge and back surface nearly or quite concentric with the rivet and form the part of the other blade to work smoothly and closely in it.

To explain the operation and advantages of this improvement in contrast with the operation of shears where the rivet is placed between the directions of the edges prolonged: Let $a$ be the point just in contact with the material to be cut, and R the position of the rivet. Let the lower blade remain stationary, bring down the upper blade till $a$ goes through the material; moving in the arc of a circle of which $a$ R is radius $a$ will be found at, $b$, its motion parallel to the edge of the lower blade having been inward and the tendency to cut the material by the principle of saw movement, the most favorable for cutting. Let us take O on the prolongation one of the cutting edges as the most advantageous position which the rivet can have without infringing my improvement. Make $a$ O$=a$ R, bring down the upper blade, $a$ will be found at $e$, its motion parallel to the cutting edge of the lower blade having been outward and its tendency to cut by perpendicular pressure, and to shove the material out. Hence by the improvement shears will cut more smoothly and work more easily than by the present method.

Let us next compare the power required to work the shears in the two cases. Draw $a$ P perpendicular to the cutting edge of the upper blade at $a$ and let the distance $a$ P represent the resistance offered by the material to the motion of the shears, through P draw P $d$ and P $f$ cutting the radius $a$ R and the perpendicular to it through $a$ at $d$ and F. $a$ $d$ will represent the resistant of motion and $a$ R the arm of lever by which it acts, when the rivet is placed outside of the angle between the edges according to the improvement. If the rivet be placed at O, then $a$ P will be perpendicular to O $a$ and the resistant of motion will be $a$ P acting by the arm of lever $a$ O$=a$ R. But while the arms of lever are the same the resisting force is greater by the old than by the improved mode in the same proportion as the diagonal $a$ P is greater than the side of $a$ $d$ of the rectangle. Hence by the improvement there is in this way another gain of power.

A comparison of my model with a pair of the best tailors shears now in use will moreover show that with equal openings of the hand the cutting by my improvement is done much nearer to the rivets and this gives a third cause, increased ease in working attained thereby.

Having thus explained the nature of my improvement, and pointed out the important advantages it secures, what I claim and desire to secure by Letters Patent is 1. The placing of the rivets of tailors shears outside of the angle formed by prolonging the directions of the cutting edges for the purpose of giving to the cutting point of the edge an oblique backward motion, thereby increasing the ease of cutting diminishing the resistance to working the shears and bringing the cutting points nearer the hand.

2. Combining with this the guide S a stud set in one blade working in a curved slot in the other, having a screw thread cut on it, on which is placed a rivet head nut; or other equivalent device for the purpose of steadying the motion of the edges and more effectual securing them from spreading in working.

JOS. PHARES.

Witnesses:
J. McNULTY,
ADRIAN HEGEMAN.